United States Patent [19]
Betz et al.

[11] Patent Number: 5,211,064
[45] Date of Patent: May 18, 1993

[54] POWER TAKE-OFF DRIVE

[75] Inventors: Michael A. Betz, Huxley; Patric N. Chamberlain, Ankeny, both of Iowa

[73] Assignee: Sauer Inc., Ames, Iowa

[21] Appl. No.: 703,161

[22] Filed: May 20, 1991

[51] Int. Cl.[5] .............................................. F16H 37/00
[52] U.S. Cl. ..................................... 74/15.8; 74/15.66
[58] Field of Search .................... 74/15.2, 15.8, 15.82, 74/15.86; 192/48.2, 48.5

[56] References Cited

U.S. PATENT DOCUMENTS

| | | | |
|---|---|---|---|
| 3,597,998 | 8/1971 | Ebert | 74/15.66 X |
| 3,922,931 | 12/1975 | Osujyo et al. | 74/15.2 X |
| 4,373,597 | 2/1983 | Itatani et al. | 74/15.63 X |
| 4,542,801 | 9/1985 | Richards et al. | 74/15.86 X |
| 4,572,343 | 2/1986 | Boffelli | 192/48.2 X |
| 4,579,183 | 4/1986 | Irikura et al. | 74/15.6 X |
| 4,660,425 | 4/1987 | Nerstad et al. | 74/15.86 |
| 4,727,759 | 3/1988 | Yamaoka et al. | 74/15.2 |
| 4,785,682 | 11/1988 | Nishimura et al. | 74/15.66 X |
| 4,882,940 | 11/1989 | Yamaoka et al. | 74/15.6 X |
| 5,046,994 | 9/1991 | Hasegawa et al. | 74/15.2 X |

FOREIGN PATENT DOCUMENTS

| | | | |
|---|---|---|---|
| 1270202 | 7/1961 | France | 74/15.8 |
| 59-164440 | 9/1984 | Japan | 74/15.2 |

Primary Examiner—Allan D. Herrmann
Assistant Examiner—David W. Laub
Attorney, Agent, or Firm—Zarley, McKee, Thomte, Voorhees, & Sease

[57] ABSTRACT

An integrated drive arrangement for a vehicle propulsion system for transmitting vehicle drive torque and for independently driving external implements. The drive arrangement includes a power input shaft having a number of axially spaced drive gears and being driven by a prime mover. The pump shaft of a variable displacement pump is drivingly connected with one of the drive gears of the power input shaft. A fixed displacement motor is connected in closed circuit to the variable displacement pump. A number of drive pinions are spaced axially along an intermediate shaft which is spaced from the power input shaft and are connected to the intermediate shaft and the power input shaft by an electromagnetic clutch. First and second power take-off shafts are drivingly connected with the intermediate shaft such that the power input shaft imparts independent rotation to the power take-off shafts and the pump shaft.

19 Claims, 4 Drawing Sheets

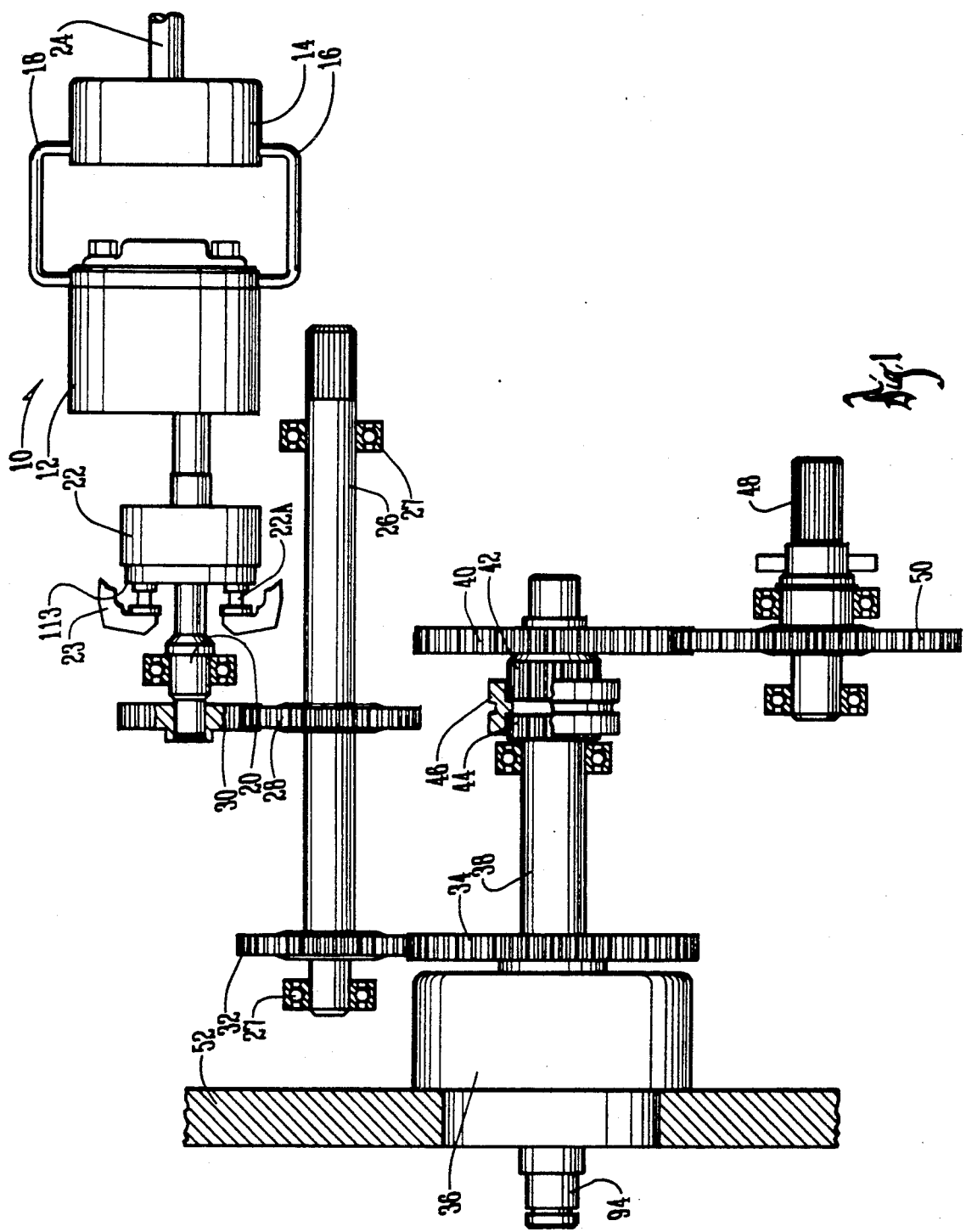

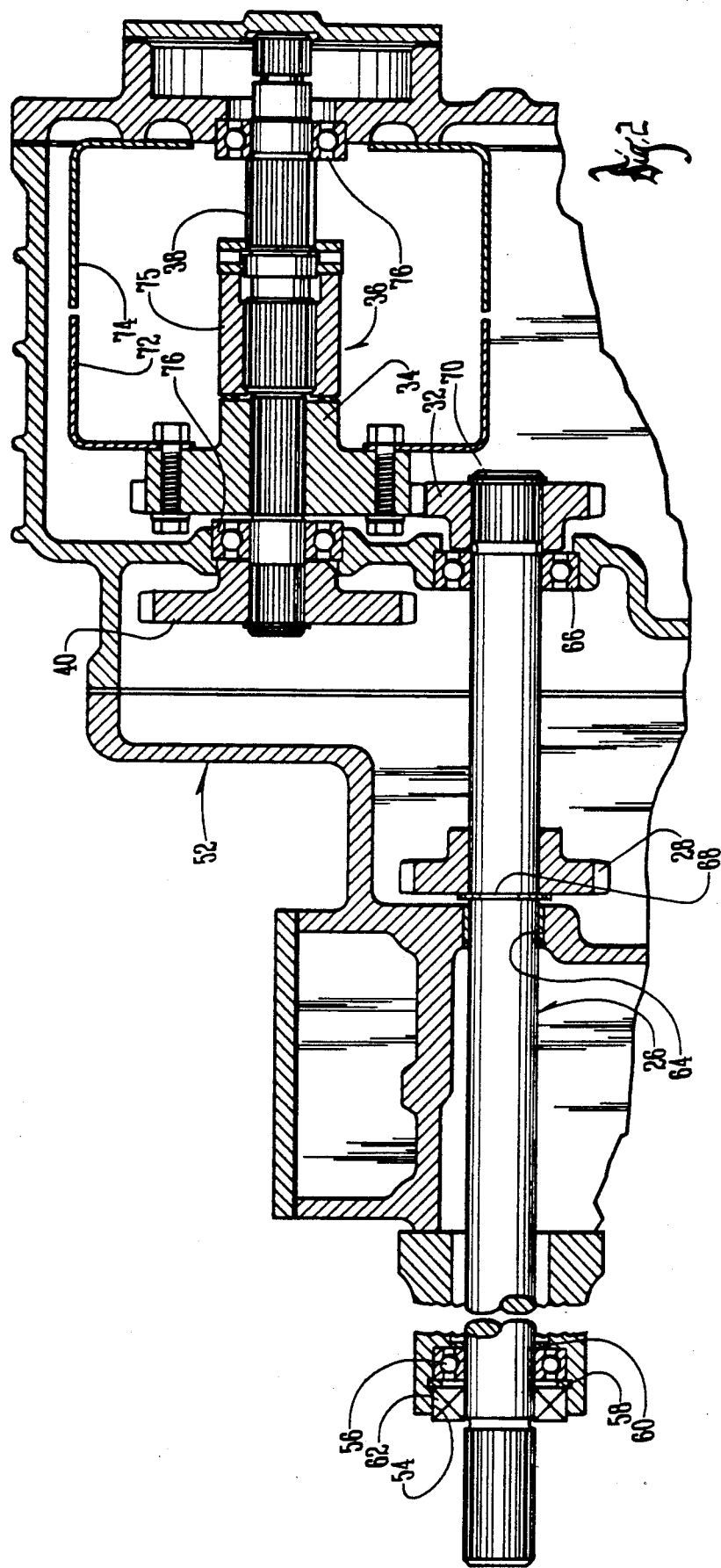

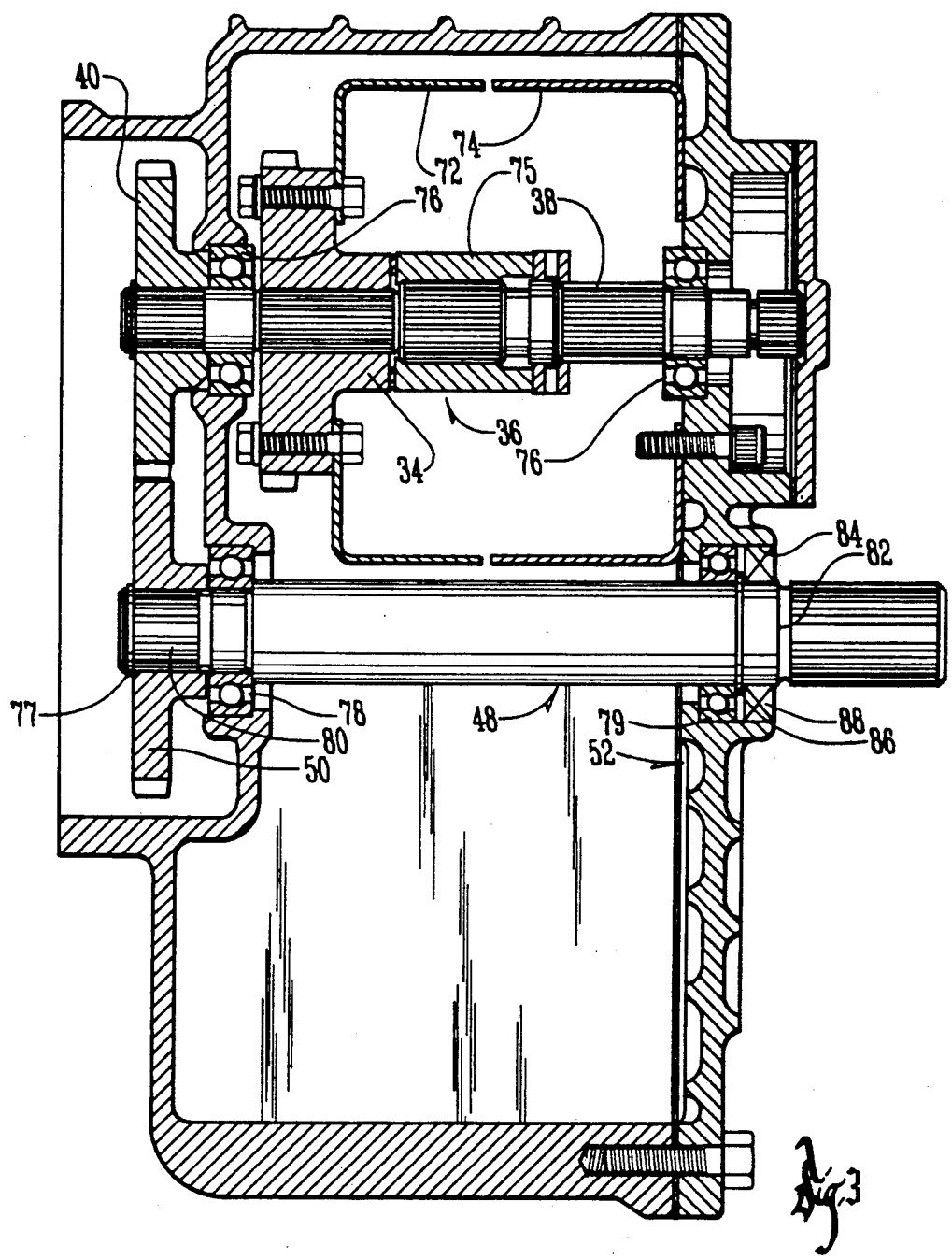

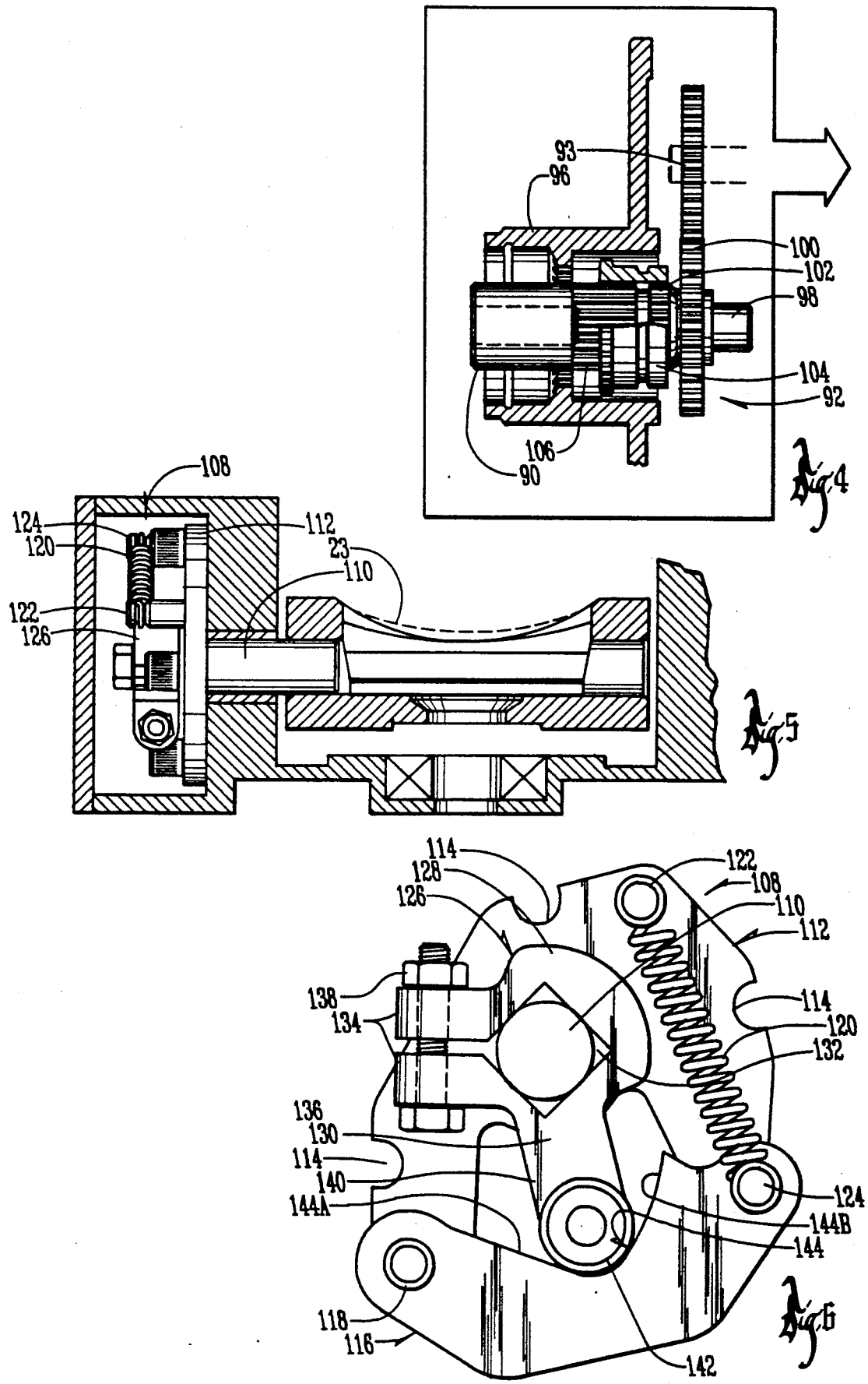

POWER TAKE-OFF DRIVE

BACKGROUND OF THE INVENTION

Technical Field

This invention relates to a hydrostatic transmission arrangement for use in working vehicles, such as garden tractors, and more specifically toward a transmission drive arrangement for supplying drive torque to a vehicle axle and supplying auxiliary torque to a number of power take-off shafts for driving external working implements.

Background Art

Present hydrostatic transmissions include a variable displacement hydraulic pump driven by an input shaft. A hydraulic fluid is pumped from the hydraulic pump to a fixed displacement hydraulic motor for driving an output shaft. In these devices, there is no mechanical linkage between the input shaft which drives the hydraulic pump and the output shaft which is driven by the hydraulic motor.

Many hydraulic pumps of the variable displacement type have a rotating cylinder block with pistons axially movable therein. The displacement of the hydraulic pump is proportional to the stroke of the pistons within the cylinder block. Where the hydraulic pump is of the axial piston type, the pistons engage a tiltable swashplate to vary the stroke of the pistons. When the swashplate is perpendicular to the axis of the cylinder block, the swashplate is in a neutral or a zero displacement position and the hydraulic pump has no output.

In order to maintain the swashplate in its zero displacement when no control forces are applied thereto, various swashplate centering mechanisms have been utilized. Generally, such centering mechanisms comprise a plurality of springs which apply opposite biasing forces on the swashplate at points spaced from the tilt axis of the swashplate. This approach requires very accurate spring lengths to insure that the centering force of a given spring does not start until the swashplate is tilted toward that spring and that each of the plurality of springs applies an equivalent control force.

An additional feature desirous in the transmission of a working vehicle is the capability of transmitting power for driving working implements. This conventionally is accomplished through the use of power take-off shafts which are driven by the transmission and, in turn, supply power to the working implements. In many cases, a power input shaft is coupled directly to a pump input shaft, and a power take-off shaft is drivingly engaged either directly or through a mechanical linkage to the pump shaft. With this type of arrangement the power which can be transmitted to the working implements is limited by the material strength characteristics of the pump shaft. When the amount of power required by a working implement exceeds the load capacity of the pump shaft, if the pump is not replaced with a more heavy duty device, it is impossible to drive the working implement without inducing failure of the transmission.

The present invention is directed toward overcoming one or more of the problems set forth above.

SUMMARY OF THE INVENTION

An object of the present invention, therefore, is to provide an improved hydrostatic transmission arrangement for supplying drive torque to a vehicle axle and independently supplying auxiliary torque to a number of power take-off shafts for driving external working implements.

In the exemplary embodiment of the invention, a hydrostatic transmission includes a power input shaft driving the input shaft of a variable displacement pump. A fixed displacement motor is connected in closed circuit to the variable displacement pump and has a motor output shaft. The variable displacement pump and the fixed displacement motor together define a hydraulic drive unit for transmitting vehicle drive torque between the power input shaft and the motor output shaft.

An intermediate clutch shaft supports an electromagnetic clutch and is driven independently by the power input shaft and drives a first power take-off shaft. The pump shaft is driven at a first ratio to the power input shaft speed and the power take-off shaft is driven at a second ratio to the power input shaft speed, with the first ratio and the second ratio having different values. A second power take-off shaft alternatively is provided and extends parallel to and is spaced from the intermediate clutch shaft and also is driven by the power input shaft.

The present invention also envisions a vehicle propulsion system including a hydraulic drive unit for transmitting vehicle drive torque, and a variable displacement pump, with a positionable swashplate for controlling the operation of the hydraulic drive unit, has a neutral return device. The neutral return device includes a centering mechanism adjacent the swashplate for controlling the orientation thereof in the absence of a swashplate positioning force. A cam follower arm is mounted on the swashplate and has an end-mounted roller. A rotatable cam is mounted adjacent the swashplate and has a V-shaped notch adapted to receive the roller of the cam follower arm. A single spring connects the pump and the rotatable cam such that the swashplate is biased toward a centered position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

FIG. 1 is a schematic view of the hydrostatic transmission drive arrangement of the present invention;

FIG. 2 is front elevational view illustrating the relationship of the power input shaft and the clutch of the drive arrangement shown in FIG. 1;

FIG. 3 is top plan view illustrating the relationship of the clutch and power take-off shaft of the drive arrangement shown in FIG. 1;

FIG. 4 is a schematic view of a second power take-off shaft for the drive arrangement shown in FIG. 1;

FIG. 5 is a side elevational view of a swash-plate centering mechanism for the transmission shown in FIG. 1; and FIG. 6 is a front elevational view of the swash-plate centering mechanism shown in FIG. 5.

DESCRIPTION OF THE PREFERRED EMBODIMENT

A generally schematic view of a hydrostatic transmission drive arrangement embodying the present invention is illustrated in FIG. 1. A hydrostatic transmission, shown generally at 10, includes a variable displacement hydraulic pump 12 connected in a closed fluid circuit with a hydraulic motor 14 by a pair of fluid lines 16 and 18. Variable displacement pump 12 has an input shaft 20 and a rotating cylinder block 22 with a plurality of pistons 22a axially movable therein. An adjustable swashplate 23 is disposed adjacent rotating cylinder block 22 to limit the stroke of the pistons and thereby prescribe the output of pump 12. In a manner commonly known to those skilled in the art, hydrostatic transmission 10 thereby is operable to transmit a torque applied to pump input shaft 20 to a motor shaft 24 on hydraulic motor 14 for driving a vehicle axle (not shown). A power input shaft 26, supported by bearings 27, has a rotatable pump drive pinion 28 fixed to an intermediate portion thereof and engages a pump drive gear 30 attached to an end of pump input shaft 20. Energization of power input shaft 26 thereby results in rotation of the pump input shaft, resulting in flow of hydraulic fluid through fluid lines 16 and 18, and rotation of motor output shaft 24.

A clutch drive pinion 32 is mounted near an end of power input shaft 26 spaced from pump drive pinion 28 and meshes with a clutch gear 34 which is coupled with an electromagnetic clutch 36. Because the drive arrangement operates in a fluid environment, clutch 36 must be of a type generally referred to as a wet electromagnetic clutch. Clutch gear 34 normally is free to rotate on a shaft 38 when electromagnetic clutch 36 is disengaged. When the clutch is engaged, however, gear 34 is coupled with shaft 38 such that energization of power input shaft 26 imparts rotary motion to both pump input shaft 20 as well as shaft 38.

A drive pinion 40 having an external splined 42 is supported on shaft 38 and spaced from clutch gear 34. Drive pinion 40 and spline 42 are free to rotate on shaft 38. Shaft 38 mounts a second external spline 44 adjacent spline 42. A slidable coupling 46 is movably mounted over external spline 42 on drive pinion 40. By sliding coupling 46 away from drive pinion 40 and over a portion of spline 44 on shaft 38 as shown in FIG. 1 drive pinion 40 is coupled with shaft 38.

A power take-off shaft 48 drivingly engages drive pinion 40 by means of a PTO drive gear 50 mounted thereon. When electromagnetic clutch 36 is engaged such that energization of power input shaft 26 results in rotation of shaft 38, and coupling 46 interengages splines 42 and 44 such that drive pinion 40 is coupled with shaft 38, the power input shaft thereby is operable to supply input power to both hydrostatic transmission 10 and power take-off shaft 48.

Referring in greater detail to FIGS. 2 through 4, power input shaft 26 extends into a sealed hydrostatic transmission housing 52 through a circular opening 54. An annular ball bearing 56 journals input shaft 26 for rotation within opening 54 and is sandwiched between a pair of retaining rings 58 and 60. An annular lip seal 62 secures the shaft within opening 54. The power input shaft extends through an annular bearing 64 and is supported at an opposite end by a second ball bearing 66. Pump drive pinion 28 is mounted on the power input shaft near bearing 64 and is held in place by a retaining ring 68. Clutch gear 34 is fixed to an innermost end 70 of the power input shaft.

Electromagnetic clutch 36 is mounted adjacent clutch drive pinion 32 and has a pair of transfer plates 72 and 74 and an armature 75. Transfer plate 72 is fixed to clutch gear 34 which, in turn, engages the clutch drive pinion. Transfer plate 74 is attached to clutch shaft 38. When transfer plates 72 and 74 are electromagnetically-engaged by armature 75, clutch gear 34 thereby is coupled to shaft 38 such that rotation of power input shaft 20 results in rotation of clutch shaft 38. The clutch shaft extends between a pair of spaced-apart ball bearings 76 and supports power take-off drive pinion 40 at one end.

Power take-off shaft 48 extends substantially parallel to clutch shaft 38 and is journalled on a pair of spaced-apart ball bearings 78 and 79 for rotation on housing 52. A retaining ring 78 fixes power take-off drive gear 50 on an end 80 of the power take-off shaft. An opposite end 82 of the power take-off shaft is secured within an opening 84 in housing 52 by a retaining ring 86 and a lip seal 88.

Operation of the above transmission can be understood as follows. Power input shaft 26 is energized by a suitable prime mover means (not shown) such as an internal combustion engine. Pump drive pinion 28 engages pump drive gear 30 and rotates pump input shaft 20. Torque supplied by means of the pump drive gear is transmitted through hydraulic fluid in lines 16 and 18 to transmit torque to motor output shaft 24. By prescribing the position of adjustable swashplate 23, the pump displacement, as determined by the stroke of pistons 22a moving within rotating cylinder block 22, is established, and the relationship between the input torque applied to drive gear 30 and the output torque achieved at shaft 24 similarly is prescribed.

Engagement of electromagnetic clutch 36 couples drive shaft 26 with clutch shaft 38 such that torque is transmitted to power take-off shaft 48. With this arrangement, the power transmitted to the power take-off shaft is limited only by the strength of the power input shaft, clutch shaft 38, and the interposed gears. In instances where large torques are required for driving particular implements, it is not necessary to increase the torsional strength characteristics of the pump shaft. Because the pump shaft is driven independently of the power take-off shaft, it is possible to drive the pump input shaft at a preset ratio of pump speed to engine speed while driving the PTO shaft at a speed independent of the pump shaft. By substituting various speed reducing gears for the pump drive gear or the pump drive pinion, the pump speed or power take-off shaft speed may be simply selected for a fixed power input shaft speed.

Additionally, the housing 52 provides a sealed operating environment for the interengaged drive train components. Oil can be circulated throughout the housing to provide continuous lubrication and flushing of fretting particles commonly developed at the interfaces of the drive pinions and gears. Such an insurance extends the life of the drive train components and significantly reduces typically encountered servicing and component replacement costs.

In an alternative embodiment, and as shown somewhat schematically in FIG. 4, a second power take-off shaft 90 may be driven by power input shaft 26 independently of pump shaft 20. In FIG. 4, an auxiliary drive kit 92 includes a second power take-off shaft drive pinion 93 which would mount concentrically on an end 94 of clutch shaft 38. An auxiliary housing structure 96 attaches exteriorly of transmission housing 52 and rotatably supports an axle shaft 98. Power take-off shaft 90 is freely rotatable on axle shaft 98. A drive gear 100 having an external spline portion 102 is freely rotatable on axle 98 and engages drive pinion 93. A movable coupling 104 engages external spline 102 with an identical spline 106 formed on power take-off shaft 90. Power input shaft 26 thereby is operable to transmit drive torque to power take-off shafts 48 and 90 for driving external implements.

As noted above, variable displacement pump 12 has a positionable swashplate 23 for prescribing the stroke of axially movable pistons 22a within rotating cylinder block 22. In order to assure that swashplate 23 moves towards a neutral position in the absence of an external swashplate displacing force, a swashplate centering assembly 108 is provided, as shown in FIGS. 5 and 6.

As is generally well known, a positionable swashplate 23 (not shown in FIG. 6) includes a laterally-extending trunnion 110 for controlling the position thereof. As shown specifically in FIG. 6, swashplate centering assembly 108 has a generally curved plate 112 adjustably mounted on a face 113 of variable displacement pump 12 having a number of peripherally-spaced arcuate slots 114 for receiving threaded fasteners (not shown) which engage the pump surface. A rotatable cam 116 is pivoted to plate 112 at a pin connection 118, and a helical spring 120 interconnects cam 116 and plate 112 at a pin connection 122 on plate 112 and a pin connection 124 on rotatable cam 116. Each of pin connections 118, 122 and 124 are rotatable connections whereby cam 116 may rotate relative to plate 112 and spring 120 may rotate relative to plate 112 and cam 116.

A centering arm 126 is mounted on plate 112 and includes a trunnion-engaging lobe 128 and an integrally-extending tab 130. Lobe 128 has a central rectangular opening 132 for frictionally engaging swashplate trunnion 110. A pair of resilient lips 134 extend from lobe 128 and receive an adjustment bolt 136 which, together with a nut 138 establish a clamping action and thus the degree of frictional engagement of lobe 128 with the trunnion. A distal end portion 140 of tab 130 rotatably mounts a circular roller 142 which rests neutrally in a crook or V-shaped portion 144 of rotatable cam 116.

Operation of centering assembly 108 is as follows. Under the influence of an external swashplate centering force, swashplate 23, trunnion 110 and centering arm 126 are rotated about an axis perpendicular to the illustration in FIG. 6. As the centering arm and tab 130 are angularly displaced, circular roller 142 moves along cam surfaces 144a and 144b which define V-shaped portion 144. The displacement results in rotation of cam 116 about pin connection 118 and thereby extends or compresses helical spring 120. An elastic restoring force developed within spring 120 establishes a biasing force whereby rotatable cam 116, centering arm 126, trunnion 110 and swashplate 23 are biased towards a neutral or center position in which circular roller 142 rests at the apex of V-shaped notch 144 with spring 120 in an equilibrium configuration.

In order to assure that swashplate 23 is disposed in an exactly neutral position with roller 142 engaging V-shaped notch 144, the swashplate centering assembly is installed in a novel manner. During assembly, swashplate 23 is levelled by an external fixture which indicates pump neutral. Plate 112 is mounted on pump surface 113 with threaded fasteners loosely engaging slots 114. The centering arm, rotatable cam, circular roller and helical spring then are installed. Since the swashplate is held in neutral, the centering assembly will seek an equilibrium position due to the force of the spring. Once equilibrium is determined, the threaded fasteners in adjustment slots 114 are firmly tightened. The above procedure results in the centering assembly being installed consistently in a precise configuration and eliminates the production of transmissions which induce low speed propulsion in the absence of external commands. Unless the swashplate is explicitly commanded to an off-neutral position, the centering assembly will maintain reliably true neutral operation of the pump.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A drive arrangement for a vehicle propulsion system including a hydraulic drive unit for transmitting vehicle drive torque and a power take-off shaft for driving external implements comprising:
   a power input shaft;
   a hydraulic pump having a pump shaft driven in an axially offset manner by the power input shaft such that the torque capacity of the power input shaft may be greater than if said pump shaft were driven coaxially;
   a hydraulic motor connected in closed circuit to the hydraulic pump and having a motor output shaft, the hydraulic pump and the hydraulic motor together defining the hydraulic drive unit for transmitting vehicle drive torque between the power input shaft and the motor output shaft; and
   an intermediate shaft driven by the power input shaft and driving the power take-off shaft.

2. The drive arrangement of claim 1 in which the hydraulic drive unit, the power input shaft, the intermediate shaft and the power take-off shaft all are integrated within a single housing.

3. The drive arrangement of claim 1 in which a speed reduction element is disposed between the power take-off shaft and the intermediate shaft.

4. The drive arrangement of claim 1 in which the intermediate shaft is a clutch shaft.

5. The drive arrangement of claim 1 in which the pump shaft is driven at a first ratio to the power input shaft speed.

6. The drive arrangement of claim 5 in which the power take-off shaft is driven at a second ratio to the power input shaft speed.

7. The drive arrangement of claim 6 in which the first ratio and the second ratio have different values.

8. A drive arrangement for a vehicle propulsion system for transmitting vehicle drive torque and for independently driving external implements, comprising:
   a power input shaft having a number of axially spaced drive pinions;
   a variable displacement hydraulic pump having a pump shaft axially offset from the power input shaft, the pump shaft including a pump drive gear engaging one of the drive pinions of the power input shaft;

a hydraulic motor connected in closed circuit to the variable displacement pump and having a motor output shaft;

an intermediate shaft spaced from the power input shaft, the intermediate shaft being a clutch shaft and having a clutch gear fixedly mounted thereon;

means for selectively interconnecting the clutch gear with the clutch shaft and the power input shaft such that the power input shaft selectively imparts motion to the clutch shaft;

a power take-off shaft spaced from the clutch shaft; and means for interconnecting the clutch shaft and the power take-off shaft such that the power input shaft imparts motion to the power take-off shaft.

9. The drive arrangement of claim 8 in which the hydraulic pump, the hydraulic motor, the power input shaft, the intermediate shaft and the power take-off shaft all are disposed within a single oil filled housing, the housing defining an oil environment for lubrication of said shafts.

10. The drive arrangement of claim 8 in which the means for selectively interconnecting the clutch gear with the clutch shaft and the power input shaft comprises a clutch mounted on the clutch shaft.

11. The drive arrangement of claim 8 in which the means for selectively interconnecting the clutch gear with the clutch shaft and the power input shaft comprises an electromagnetic clutch.

12. The drive arrangement of claim 9 in which the means for selectively interconnecting the clutch gear with the clutch shaft and the power input shaft comprises a wet electromagnetic clutch.

13. The drive arrangement of claim 8 in which the means for interconnecting the clutch shaft and the power take-off shaft such that the power input shaft imparts rotary motion to the power take-off shaft include a drive pinion mounted on the clutch shaft and a complementary drive gear mounted on the power take-off shaft, whereby engagement of the drive pinion with the drive gear induces rotation of the clutch shaft and results in rotation of the power take-off shaft.

14. A drive arrangement for a vehicle propulsion system for transmitting vehicle drive torque and for independently driving external implements comprising:

a power input shaft having a number of axially spaced drive pinions and being driven by a prime mover;

a variable displacement hydraulic pump having a pump shaft spaced from the power input shaft, the pump shaft engaging one of the drive pinions of the power input shaft such that the power input shaft imparts motion to the pump shaft;

a fixed displacement hydraulic motor connected in closed circuit to the variable displacement pump and having a motor output shaft;

an intermediate shaft spaced from the power input shaft, the intermediate shaft having a number of axially spaced gears;

a clutch mounted on the intermediate shaft for selectively interconnecting one of the axially spaced gears to the intermediate shaft and the power input shaft such that the power input shaft selectively imparts motion to the intermediate shaft;

a first power take-off shaft spaced from the intermediate shaft;

a movable coupling interconnecting another of the axially spaced gears with the intermediate shaft and the first power take-off shaft such that the intermediate shaft imparts motion to the first power take-off shaft; and a second power take-off shaft spaced from the intermediate shaft and driven by the power input shaft.

15. The drive arrangement of claim 14 including a number of speed reduction elements intermediate the first power take-off shaft and the second power take-off shaft, such that each power take-off shaft may be operated at independent angular rates.

16. The drive arrangement of claim 14 including means for interconnecting the intermediate shaft and the second power take-off shaft such that the intermediate shaft selectively imparts motion to the second power take-off shaft.

17. The drive arrangement of claim 16 in which the means for interconnecting the intermediate shaft and the second power take-off shaft comprises a mechanical linkage therebetween allowing the second power take-off shaft to be actuated independently of the first power take-off shaft.

18. The drive arrangement of claim 17 in which the mechanical linkage includes a drive pinion mounted on the intermediate shaft and engageable with a drive gear rotatably mounted on the second power take shaft.

19. The drive arrangement of claim 14 in which the prime mover is an internal combustion engine.

* * * * *